US011311900B2

(12) United States Patent
Beck et al.

(10) Patent No.: US 11,311,900 B2
(45) Date of Patent: Apr. 26, 2022

(54) METHODS AND SYSTEMS FOR CREATING AEROSOLS

(71) Applicant: PALO ALTO RESEARCH CENTER INCORPORATED, Palo Alto, CA (US)

(72) Inventors: Victor Beck, Livermore, CA (US); David Mathew Johnson, San Francisco, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 196 days.

(21) Appl. No.: 16/014,402

(22) Filed: Jun. 21, 2018

(65) Prior Publication Data

US 2018/0297052 A1 Oct. 18, 2018

Related U.S. Application Data

(62) Division of application No. 14/066,435, filed on Oct. 29, 2013, now Pat. No. 10,016,777.

(51) Int. Cl.
*B05B 17/04* (2006.01)
*B01J 13/00* (2006.01)
(Continued)

(52) U.S. Cl.
CPC ........... *B05B 17/04* (2013.01); *B01J 13/0095* (2013.01); *B05B 3/02* (2013.01); *B05B 3/10* (2013.01);
(Continued)

(58) Field of Classification Search
CPC .. B05B 17/04; B05B 3/02; B05B 3/10; B05B 5/0057; B05B 5/04; B05B 7/0075;
(Continued)

(56) References Cited

U.S. PATENT DOCUMENTS 2,291,046 A 7/1942 Lange
3,326,122 A * 6/1967 Wildeman ................ B41F 7/26 101/148

(Continued)

FOREIGN PATENT DOCUMENTS

EP 2227834 8/2011
TW 201325481 A1 7/2013

OTHER PUBLICATIONS

Owens et al, Misting of non-Newtonian liquids in forward roll coating, Jul. 13, 2011, Journal of Non-Newtonian FluidMechanics, 166, pp. 1123-1128 (Year: 2011).*

(Continued)

*Primary Examiner* — Joseph A Greenlund
(74) *Attorney, Agent, or Firm* — Miller Nash LLP

(57) ABSTRACT

A process of creating an aerosol includes coating at least one of a pair of counter-rotating, adjacent rollers with a fluid, the pair of counter-rotating rollers defining a nip therebetween, rotating the counter-rotating rollers to cause the fluid to be drawn into an upstream side of the nip, causing fluid filaments of the fluid to form on a downstream side of the nip, the fluid filaments stretching between respective surfaces of the pair of counter-rotating rollers and breaking into droplets on the downstream side of the nip, and harvesting the droplets at the downstream side of the nip.

19 Claims, 17 Drawing Sheets

(51) Int. Cl.

| | |
|---|---|
| ***B05B 3/02*** | (2006.01) |
| *B05B 5/057* | (2006.01) |
| *B05B 3/10* | (2006.01) |
| *B05C 1/08* | (2006.01) |
| *B05B 7/00* | (2006.01) |

(52) U.S. Cl.
CPC ............. *B05B 5/057* (2013.01); *B05B 7/0075* (2013.01); *B05C 1/0813* (2013.01); *Y10S 118/14* (2013.01)

(58) Field of Classification Search
CPC .. B05B 7/2484; B01J 13/0095; Y10S 118/14; Y10S 118/04; B05C 1/0813; B05C 1/0817; B05C 11/1034; B41F 1/24; B41F 1/26; B41F 1/30
USPC ............ 239/8, 329, 380, 219, 220; 118/300, 118/244–245, 218, 320; 101/148
See application file for complete search history.

(56) References Cited

U.S. PATENT DOCUMENTS 3,554,815 A 1/1971 Otto
3,626,833 A * 12/1971 Koch .................... G03D 5/067 396/608
3,649,829 A 3/1972 Randolph
3,702,258 A 11/1972 Gibbons et al.
3,717,875 A 2/1973 Arciprete et al.
3,873,025 A * 3/1975 Qvarnstrom ............. B05B 3/02 239/220
3,926,114 A 12/1975 Matuschke
4,034,670 A * 7/1977 Zavodny .................. B41F 7/30 101/148
4,222,059 A 9/1980 Crean et al.
4,301,859 A 11/1981 Hollemann
4,384,296 A 5/1983 Torpey
H976 H 11/1991 Matta et al.
5,123,346 A * 6/1992 Schneider ................ B41F 7/26 101/148
5,217,742 A 6/1993 Jones et al.
5,270,086 A 12/1993 Hamlin
5,314,119 A 5/1994 Watt
5,633,045 A * 5/1997 Smith .................. B05C 1/0813 118/244
5,641,544 A * 6/1997 Melancon ................ B05C 9/02 427/331
5,733,608 A * 3/1998 Kessel ...................... B05C 9/02 427/547
5,861,195 A * 1/1999 Bhave ...................... B05D 1/34 427/402
6,382,524 B1 * 5/2002 James ....................... B05B 3/02 118/244
6,514,571 B1 * 2/2003 Piccinino, Jr .......... G03D 5/003 118/249
6,554,206 B2 * 4/2003 Watt .......................... B05B 3/02 239/122
6,576,861 B2 6/2003 Sampath et al.
6,622,335 B1 9/2003 Anderson et al.
6,692,570 B2 * 2/2004 Cottier .................... E04F 15/12 118/300
6,711,941 B2 3/2004 Braithwaite et al.
6,934,142 B2 8/2005 Grosse et al.
7,083,830 B2 8/2006 Minko
7,686,987 B2 * 3/2010 Bermel .................. B29C 41/26 264/1.34
7,855,711 B2 * 12/2010 Schmitz .................. G02F 1/167 345/107
8,132,744 B2 3/2012 King et al.
8,272,579 B2 9/2012 King et al.
8,511,251 B2 8/2013 Sato
8,552,299 B2 10/2013 Rogers et al.
8,720,370 B2 5/2014 Rebstock
8,742,246 B2 6/2014 Toyoda et al.
9,021,948 B2 * 5/2015 Pattekar ............... G03G 15/228 101/148
9,364,800 B2 6/2016 Dubief
2001/0011511 A1 * 8/2001 Kawabata ............. B41F 31/001 101/350.1
2002/0053320 A1 * 5/2002 Duthaler ............... G02F 1/1362 118/249
2002/0116987 A1 8/2002 Braithwaite
2003/0183099 A1 * 10/2003 De Vroome ........ B05C 11/1039 101/148
2004/0217184 A1 * 11/2004 Seidel ..................... B21B 27/10 239/8
2005/0000231 A1 1/2005 Lee
2006/0035033 A1 * 2/2006 Tanahashi ............ B41J 11/0015 427/421.1
2008/0225087 A1 9/2008 Lee et al.
2008/0233356 A1 9/2008 Loher et al.
2009/0014046 A1 1/2009 Yu et al.
2009/0189932 A1 7/2009 Lee et al.
2010/0060697 A1 3/2010 Lee et al.
2010/0154856 A1 6/2010 Yuichi et al.
2011/0017431 A1 1/2011 Yang et al.
2011/0150036 A1 6/2011 Lee et al.
2011/0154558 A1 6/2011 Peter et al.
2011/0267740 A1 11/2011 Jayaraman et al.
2011/0290727 A1 12/2011 Van Engelen
2012/0103213 A1 * 5/2012 Stowe ..................... B41F 35/02 101/148
2012/0227778 A1 9/2012 Leonov
2013/0033687 A1 * 2/2013 Stowe ....................... B41F 7/32 355/30
2013/0033688 A1 * 2/2013 Stowe ................... B41C 1/1033 355/30
2013/0087180 A1 4/2013 Stark et al.
2013/0104756 A1 * 5/2013 Stowe ..................... B41L 25/00 101/147
2013/0247788 A1 * 9/2013 Liu .......................... B41F 7/30 101/147
2014/0146116 A1 5/2014 Paschkewitz
2015/0115057 A1 * 4/2015 Beck .................... B01J 13/0095 239/8
2015/0119477 A1 4/2015 Beck
2015/0210009 A1 7/2015 Johnson et al.
2015/0343407 A1 * 12/2015 Johnson .................... B05B 3/02 516/6
2015/0343468 A1 * 12/2015 Johnson ............... B01J 13/0095 239/1
2015/0343477 A1 * 12/2015 Johnson ............... B01J 13/0095 239/1
2016/0175874 A1 6/2016 Beck et al.

OTHER PUBLICATIONS

"The Notebooks of Leonardo Da Vinci Arraned Rendered Into English And Intoduced vol. II" by Edward Maccurdy, Date: 1958, George Braziller, Universal Difital Library, p. 748.*
"Breakup of fluid thread in a confined geometry: drplet-plug tranistion, perturbation sensitivity, and kinetic stabilization with confinement" John G. Hadeodrn et al. Date: 2004, Physical Review E 69. pp. 1-3, figures 2, 5, and 7.*
Bhat, Pradeep P., "Formation of beads-on-a-string structures during break-up of viscoelastic filaments," Aug. 2010, vol. 6:625-631, Nature Physics, 7 pages.
Le, Hue P., "Progress and Trends in Ink-jet Printing Technology," January/Feb. 1998, vol. 42:49-62, Journal of maging Science and Technology, 16 pages, found at: http://www.imaging.org/ist/resources/tutorials/inkjet.cfm.
Oliveira, Monica S., "Iterated Stretching, Extensional Rheology and Formation of Beads-on-a-String Structures in Polymer Solutions," Jan. 20, 2006, Special Issue of JNNFM on Extensional Flow, MIT, Cambridge, MA, 36 pages.
Owen, M., "Misting of non-Newtonian Liquids in Forward Roll Coating," Jul. 13, 2011, Journal of Non-Newtonian Fluid Mechanics, vol. 166:1123-1128, 6 pages.

(56) References Cited

OTHER PUBLICATIONS

Shi, X.D., "A Cascade of Structure in a Drop Falling from a Faucet," Jul. 8, 2004, vol. 265:219-222, Science, 4 pages.
Crowe, Clayton et al.: "Multiphase Flows With Droplets and Particles", CRC Press, LLC, 1998.
Kelly, Ryan T, et al.: "The ion funnel: theory, implementations, and applications", Mass Spectrometry Reviews,vol. 29,2010, pp. 294-312.
Domnick, et al. : "The Simulation of Electrostatic Spray Painting Process with High-Speed Rotary Bell Atomizers. Part II: External Charging", Part. Part. Syst. Charact. Vol. 23, 2006, pp. 408-416, URL: http://www.ppsc-journal.com.
Bailey, Adrian G.: "The Science and technology of electrostatic powder spraying, transport and coating", Journal of Electrostatics, vol. 45, 1998, pp. 85-120.
Marple, A. and Liu, Y.H.: "Characteristics of Laminar Jet Impactors", Environmental Science & Technology, vol. 8, No. 7, Jul. 1974, pp. 648-654.
Chapter 15, "Ink Jet Printing", 14 pages, found at http://www.lintech.org/comp-per/15INK.pdf.
Zhou, Li, et al.: "Highly Conductive, Flexible, Polyurethane-Based Adhesives for Flexible and Printed Electronics," Advanced Functional Materials, vol. 23, p. 1459-1465, wileyonlinelibrary.com.
Sholin, V. et al.: "High Work Function Materials for Source/Drain Contacts in Printed Polymer Thin Transistors," Applied Physics Letters, vol. 92, 2008.
C. Huizenga, H. Zhang, E. Arens, D. Wang: "Skin and core temperature response to partial- and whole-body heating and cooling," Journal of Thermal Biology, vol. 29, Issues 7-8, Oct.-Dec. 2004, pp. 549-558.
L. Francioso, C. De Pascali, A. Taurino, P. Siciliano, A. De Risi: "Wearable and flexible thermoelectric generator with enhanced package," In Proc SPIE 8763, Smart Sensors, Actuators, and MEMS VI, 876306, May 2013.
S.-J. Kim, J.-H. Wea and B.-J. Cho: "A wearable thermoelectric generator fabricated on a glass fabric," Energy Environmental Science, 2014.
"Ortho-Planar Spring", BYI Mechanical Engineering Website, URL: http://compliantmechanisms.byu.edu/content/ortho-planar-spring, retrieved from the Internet on Dec. 23, 2014.
Bullis, Kevin, "Expandable Silicon", MIT Technology Review, Dec. 14, 2007, URL: http://www.technologyreview.com/news/409198/expandable-silicon/, retrieved from the Internet on Dec. 23, 2014.
Arens, E., "Partial- and whole-body thermal sensation and comfort—Part II: Non-uniform environmental conditions," Journal of Thermal Biology, vol. 31, Issues 1-2, Jan. 2006, pp. 60-66.
Arens, E., "Partial- and whole-body thermal sensation and comfort—Part 1: Uniform environmental conditions," Journal of Thermal Biology, vol. 31, Issues 1-2, Jan. 2006, pp. 53-59.
Hewitt, A.B., "Multilayered Carbon Nanotube/Polymer Composite Based Thermoelectric Fabrics," Nano Letters, 12(3), pp. 1307-1310, 2012.
Chen, A., "Dispenser-printed planarthick-film thermoelectric energy generators," J. Micromech. Microeng., 21(10), 2011.
http://glaciertek.com/, retrieved on Dec. 19, 2014.
http://veskimo.com/, retrieved on Dec. 19, 2014.
http://www.steelevest.com/, retrieved on Dec. 19, 2014.
http://www.stacoolvest.com/, retrieved on Dec. 19, 2014.
Francioso, L., "Flexible thermoelectric generator for ambient assisted living wearable biometric sensors", Journal of Power Sources, vol. 196, Issue 6, Mar. 15, 2011, pp. 3239-3243.
Vanhemert, Kyle, "MIT Wristband Could Make AC Obsolete", Wired.com, Oct. 30, 2013, retrieved from the Internet: http://www.wired.com/2013/10/an-ingenious-wristband-that-keeps-your-body-at-theperfect-temperature-no-ac-required/, retrieved on Dec. 19, 2014.
Matheson, Rob, "Cool Invention Wins First Place at MADMEC", MIT News Office, Oct. 17, 2013, 3 pages, retrieved from the Internet: http://newsoffice.mit.edu/2013/madmec-design-competition-1017, retrieved on Dec. 19, 2014.
Mcclure, Max, "Stanford Researchers' Cooling Glove Better than Steroids- and Helps Solve Physiological Mystery Too", Stanford Report, Aug. 29, 2012, 3 pages, retrieved from the Internet: http://news.stanford.edu/news/2012/august/cooling-glove-research-082912.html, retrieved on Dec. 19, 2014.
Owens et al.,"Misting of non-Newtonian liquids in forward roll coating," Journal of Non-Newtonian Fluid Mechanics, 166(2011) 1123-1128 (available online Jul. 13, 2011).
Anna, Shelley, L. et al., "Elasto-capillary Thinning and Breakup of Model Elastic Liquids," J. Rheology, Jan./Feb. 45(1), pp. 115-138 (2001).

* cited by examiner

METHODS AND SYSTEMS FOR CREATING AEROSOLS

CROSS-REFERENCE TO RELATED APPLICATIONS

This application is a divisional of U.S. patent application Ser. No. 14/066,435 filed Oct. 29, 2013, which is incorporated herein by reference in its entirety.

This application is related to U.S. patent application Ser. No. 14/066,418, filed Oct. 29, 2013, and entitled "METHODS AND SYSTEMS FOR CREATING AEROSOLS".

TECHNICAL FIELD

This disclosure relates to the field of atomization of fluids, more particularly to atomization of fluids using diverging surfaces.

BACKGROUND

Many manufacturing and industrial applications benefit from fluid atomization to create a fine vapor mist or aerosol, such as the fuel/air mixture used in combustion applications, atomized air-paint mixtures for spray painting, application of coatings to pharmaceuticals, adhesive applications, and the like. Once a component solution is made into an aerosol it can be readily processed to coat virtually any shaped surface. Alternatively, in the pharmaceutical industry, aerosols are commonly used in a process called "spray-drying" to create fine powders that serve as upstream component solutions to create active pharmaceutical ingredients.

In all known applications, creating the aerosol from a component solution is challenging. When the component solution behaves like a Newtonian fluid, the creation of a vapor or aerosol is accomplished by a number of conventional methods. One conventional method uses high velocity air flows to entrain air and liquid. A typical atomizer or aerosol involves the coaxial flow of air and component solution at large Reynolds and Weber numbers, i.e., the inertial forces dominate the viscous and surface tension forces in the fluid. Such flows are generally unstable and lead to fluid break-up by Kelvin-Helmholtz and Plateau-Rayleigh instabilities. In many instances, the flow is turbulent and chaotic, which strips and stretches the fluid parcels at high strain and strain rates, which leads to the entrainment of large amounts of air with the fluid and results in a fine mist of drops suspended in the air.

High velocity coaxial flows are effective when the component solution has Newtonian properties and behaves like a Newtonian fluid. However, many component solutions contain a variety of macromolecular and interacting solids components that lead to non-Newtonian properties, including shear-thinning and viscoelasticity. Conventional methods of atomization like high velocity coaxial flows and electrospray can be ineffective for component solutions that have non-Newtonian properties. For example, if a component solution is viscoelastic and strongly extensionally thickening, its extensional viscosity can increase by several orders of magnitude in the straining direction when the fluid is stretched, i.e., greater than $10^5$ for some high molecular weight polymer component solutions.

During jetting, the extensional thickening of component solutions having non-Newtonian properties causes the viscous drag to overwhelm the inertial and surface tension forces, which allows the system to support large strain before breaking-up and preventing the formation of small drops. The jetting leads to the formation of long, sticky filaments, films, and tendrils that never break-up and become suspended in air. Essentially, the liquid stretches, but never breaks into droplets to form a mist or vapor.

The principal problem with coaxial flow systems to create aerosols is that the straining direction is coincident with the translation direction. The filament eventually breaks up into droplets to form a mist, but to achieve the large strain the filaments issuing from the jet must necessarily travel long distances. As the filaments travel, the filaments lose momentum and can recoil to reform large droplets. Alternatively, attempts to continually impel the filament during its trajectory require impractically long jetting to break the filaments and form droplets.

Therefore, methods and systems that create aerosols from fluids that show one or both of Newtonian and non-Newtonian properties would be beneficial in the art.

SUMMARY

A process of creating an aerosol includes coating at least one of a pair of counter-rotating, adjacent rollers with a fluid, the pair of counter-rotating rollers defining a nip therebetween, rotating the counter-rotating rollers to cause the fluid to be drawn into an upstream side of the nip, causing fluid filaments of the fluid to form on a downstream side of the nip, the fluid filaments stretching between respective surfaces of the pair of counter-rotating rollers and breaking into droplets on the downstream side of the nip, and harvesting the droplets at the downstream side of the nip.

DETAILED DESCRIPTION

Systems and methods for creating aerosols are disclosed in which fluid filaments are stretched and break-up into droplets that create an aerosol, mist, or other vapor. Aerosols, mists, and vapors are interchangeable terms used to describe one or more droplets of fluid filaments that become suspended in air. The fluids are often liquids, having either Newtonian or non-Newtonian properties. Generally, fluids having non-Newtonian properties can have strong extensional thickening, which cause their extensional viscosity to increase significantly, sometimes several orders of magnitude, in the straining direction when strained. The extensional thickening of non-Newtonian fluids causes viscous drag that overwhelms the inertial and surface tension forces of the fluid and allows the system to support large strain before breaking-up and preventing the formation of small drops or droplets.

If strained and stretched enough along an appropriately long strain pathway, all fluids, including fluids having Newtonian and non-Newtonian properties, eventually break-up into small droplets and form a mist or aerosol. All fluids can be continually stretched to form fluid filaments (stretched fluid) until the fluid filaments break into several droplets thus forming a mist or aerosol.

The process of straining and stretching fluid filaments can be repeated with excess fluid remaining after the first round of droplets have been formed or with new fluid. Further, multiple fluid filaments can be stretched in parallel with the first fluid filament stretching and straining process thus increasing the volume of the formed droplets. The amount of time between stretching the first fluid filament and any additional excess fluid filaments can be defined by a time period that may be adjusted or controlled, as desired. The time periods between multiple stretching and breaking of fluid filaments can be variable or can be constant.

Figure 1:
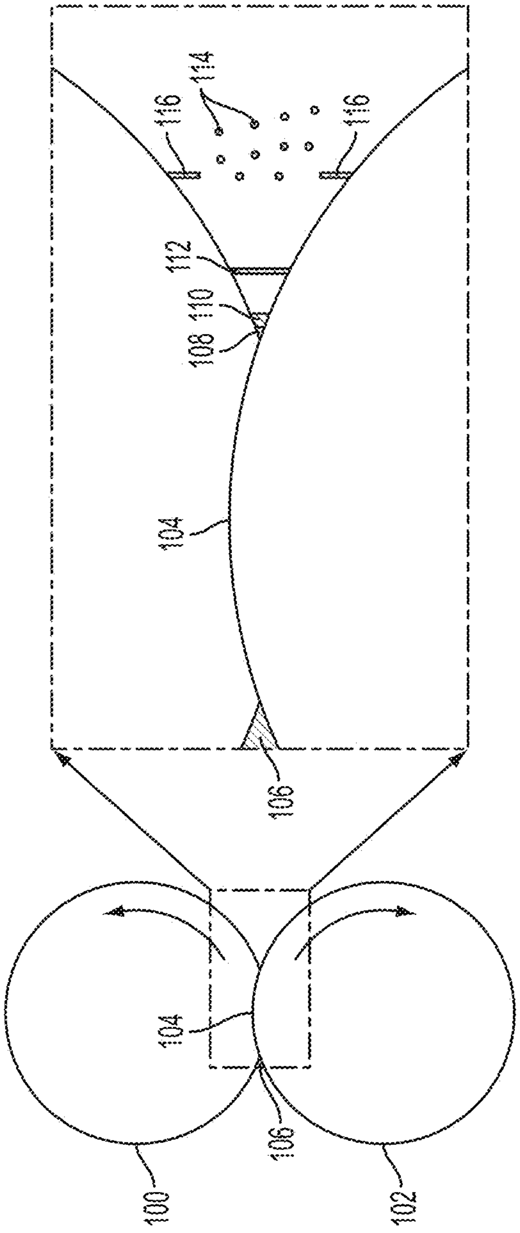
FIG. 1 is a progressive illustration of fluid being drawn through a nip defined between two rollers and a fluid filament stretching, according to aspects of the disclosure.

FIG. 1 shows a progression of fluid that is stretched by a pair of counter-rotating rollers 100, 102. A nip 104 is defined as the space between the two rollers 100, 102 into which the fluid is drawn when the rollers 100, 102 counter-rotate. The fluid pools at an upstream side 106 of the nip 104 and is drawn through the nip 104. On a downstream side 108 of the nip 104, the fluid is stretched between the surfaces of the two rollers 100, 102 into a fluid filament 110. As the rollers 100, 102 counter-rotate, the surfaces of the rollers 100, 102 to which the fluid filament 110 adheres remains the same, but the space between such surface is greater. The fluid filament 112 grows longer and thinner as the surfaces of the rollers 100, 102 rotate away from each other. When the fluid filament 112 reaches a point of the liquid bridge becoming unstable, which is also the capillary break-up point for the fluid filament 112, the fluid filament 112 breaks up into several droplets 114 and leaves excess fluid 116 behind on each of the roller's surface. The excess fluid 116 retracts to the surface of its respective roller and can be part of the fluid that pools and is drawn through the nip on the next rotation of the rollers. The process can be repeated to provide a continuous mist.

Figure 2:
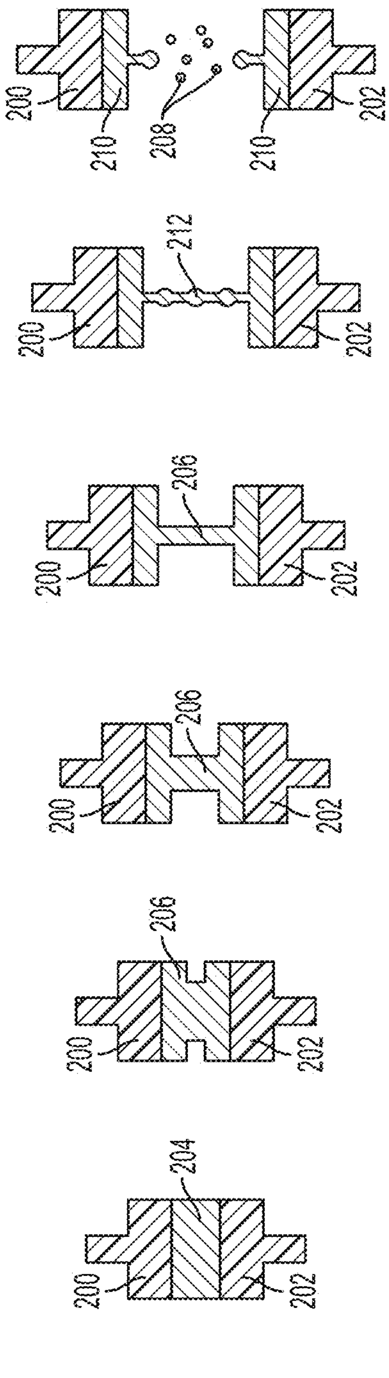
FIG. 2 is an example of a pair of pistons between which fluid is stretched and breaks.

FIG. 2 shows a progression of fluid 204 that is stretched between a pair of pistons 200, 202 to form a fluid filament 206 that eventually breaks up into a plurality of droplets 206. Fluid 204 is placed between the pistons 200, 202. The pistons 200, 202 are pulled apart and a continuous strain is applied to cause the fluid 204 to stretch between the pistons 200, 202 and form a fluid filament 206. As the fluid filament 206 grows longer and thinner, the fluid filament 206 eventually reaches its capillary break-up point at which it breaks into multiple droplets 208 and leaves excess fluid 210 behind on the surface of each piston 200, 202. FIG. 2 also shows a beads-on-a-string structure 212, which is the precursor to fluid filament 206 reach its capillary break-up point at which time the droplets 208 form. Excess fluid 210 is pooled on the pistons 200, 202 and the pistons 200, 202 can be brought back together and the fluid stretched again, thereby repeating the process and forming additional mist droplets.

Figure 3:
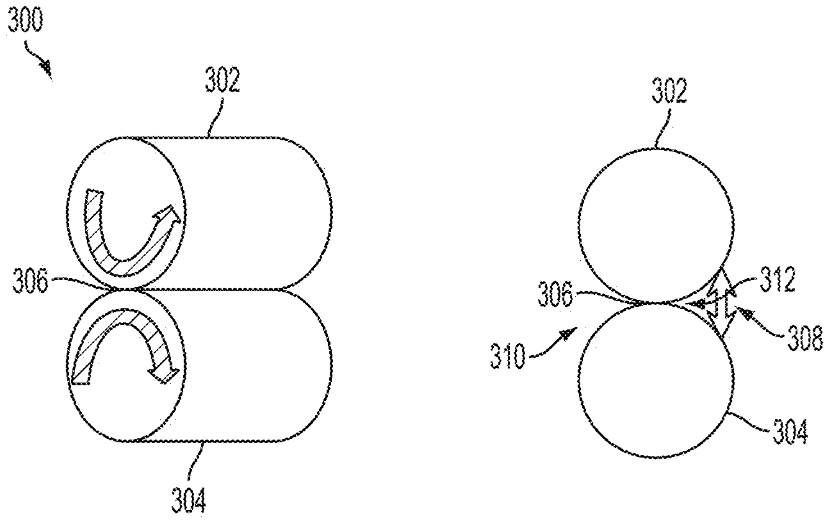
FIG. 3 shows a pair of counter-rotating rollers and a filament formed on a downstream side of the nip, in accordance with aspects of the disclosure.

FIG. 3 shows an example pair of counter-rotating rollers 302, 304. The rollers 302, 304 define a nip 306, which is the region between the rollers. In some examples, the nip is defined by the space between rollers that are physically spaced apart. In other examples the nip 306 is defined between the rollers physically touching each other. In yet other examples, the rollers have a flexible surface material that compresses when the rollers contact each other at the nip.

The nip 306 has an upstream side 310 and a downstream side 312. Fluid coating the roller(s) pools on the upstream side 310 of the nip 306. The fluid is drawn through the nip 306 to the downstream side 312 and stretched to form a fluid filament 308. The fluid filament 308 has a continuous and increasing strain applied to it on the downstream side, which causes the fluid filament 308 to grow longer and thinner as the strain is increased and the surfaces of the rollers 302, 304 are pulled farther apart. In the example shown in FIG. 3, the strain applied to the fluid filament 308 is increased because of the counter-rotation of the rollers 302, 304—the fluid remains attached to the same location on the surfaces of the rollers and the rollers counter-rotate, which causes a greater distance between the rollers' surfaces as the rotation occurs, thereby stretching the fluid filament until it breaks.

Figure 4:
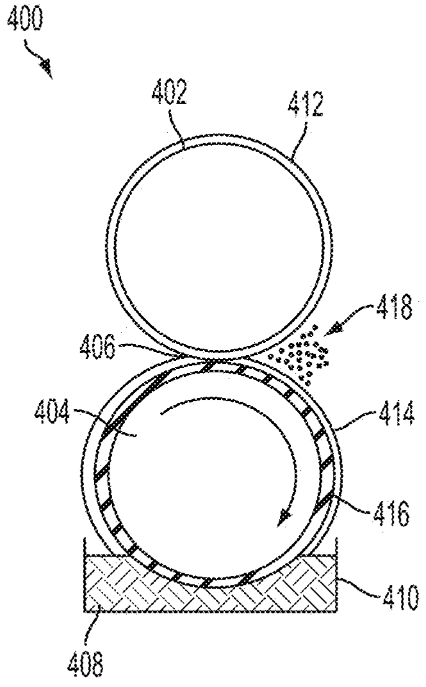
FIG. 4 is a cross-sectional view of an exemplary pair of counter-rotating rollers with a fluid reservoir.

FIG. 4 shows a more detailed view of an aerosol creation system 400 having a pair of counter rotating rollers 402, 404. Similar to FIG. 3, the pair of counter-rotating rollers 402, 404 of FIG. 4 define a nip 406 therebetween and they counter-rotate with respect to each other. The rollers 402, 404 are both coated with a fluid 412, 414, respectively. The fluid 412, 414 extends around the entire circumference of each roller 402, 404. Some portion of the fluid 412, 414 on one or both rollers 402, 404 could partially dry-off leaving areas of the roller surface(s) without a fluid coating. Alternatively, the fluid can coat only one of the pair of rollers that could also experience some partial dry-off areas, in other examples.

In FIG. 4, a portion of the lower roller 404 is submerged in a coating pan 408 that contains the fluid 410 that coats the lower roller 404. The lower roller 404 also has a rubber layer 416 that enables a negative gap to be implemented between the lower roller 404 and the upper roller 402. The negative gap between the two rollers 402, 404 causes the fluid to be reversibly compressed between the rollers 402, 404. The rubber layer 416 also encourages the fluid 410 to adhere to the roller 404 surface. The rubber layer 416 is rubber in this example, but can be any other suitable material that helps the fluid adhere to the roller in other examples.

Between the pair of counter-rotating rollers 402, 404 is a nip 406. In this example, the nip squeezes the fluid layers 412, 414 between the two rollers 402, 404 at a controlled fluid thickness. The controlled fluid thickness can be adjustable in some examples or can be fixed in other examples. Controlling the fluid thickness controls the volume of and manner in which the droplets 418 of the mist are formed on the downstream side of the nip 406. As discussed above regarding FIG. 1, the fluid can pool at the upstream side of the nip 406 before it passes through the nip 406. The pooling of fluid in the example shown in FIG. 4 can be a combination of the fluid from both rollers 402, 404.

Figure 5:
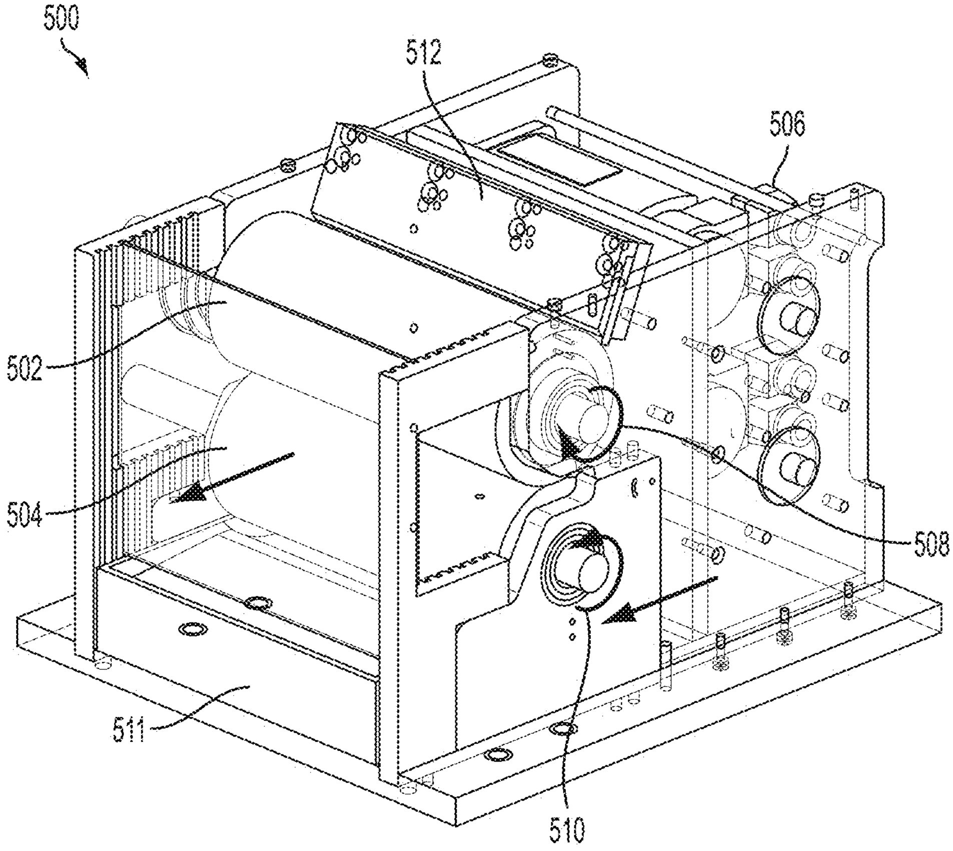
FIG. 5 is an example of an aerosol creation machine having a pair of counter-rotating rollers that create aerosol.

FIG. 5 shows an example of an aerosol creation system 500 having a pair of counter-rotating rollers 502, 504 as a strain element that stretches the fluid. A driving element, such as the motors 506 shown in FIG. 5, drive the pair of counter-rotating rollers 502, 504 to rotate in counter-rotation with respect to each other, as indicated by the arrows 508, 510 in FIG. 5. A fluid source 511, such as a reservoir with liquid in it, coats one or both of the rollers 502, 504 with a fluid. A film of fluid forms on the surface(s) one or both of the rollers 502, 504. A metering blade 512 or other film thickness control mechanism may be included in the filament creation system 500 to control the thickness of the film on the roller(s) 502, 504. The metering blade 512 either contacts, as shown in FIG. 5, or comes into near contact with one or both of the rollers 502, 504 to control the thickness of the film of fluid on the roller(s) 502, 504.

As discussed above, when the rollers counter-rotate with respect to each other, the fluid coating one or both of the rollers is drawn into a nip defined between the rollers. The fluid filament stretches on a downstream side of the nip and breaks into droplets to form the mist on the downstream side of the nip. The fluid filament breaking into droplets flows in a direction that is away from the rollers themselves. A harvesting element can be positioned to collect mist that is formed by the fluid coating being drawn through the nip of the rollers. The mist is a collection of the droplets that are formed by the fluid filaments breaking.

Figure 6A:
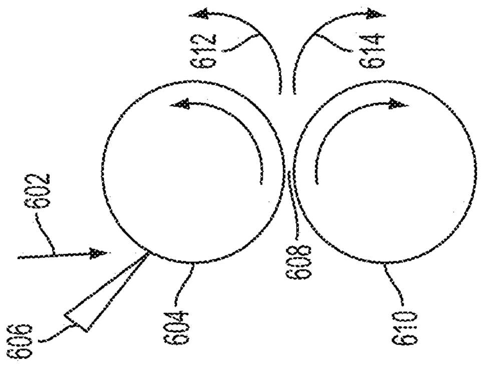
FIGS. 6A and 6B are two examples of fluid coating techniques for a pair of counter-rotating rollers.
Figure 6B:
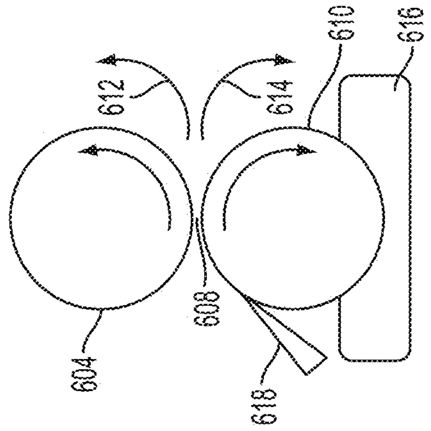

FIGS. 6A and 6B show two different types of fluid coating techniques for aerosol creation systems having a pair of counter-rotating rollers that stretch the fluid. FIG. 6A includes a fluid feed 602 that is directed to cause the fluid to contact the top roller 604 of the pair of counter-rotating rollers. The fluid feed 602 causes the fluid to contact the top roller 604 near where a metering blade 606 also contacts the top roller 602, in this example. The metering blade 606 controls the thickness of the fluid that adheres to the surface of the top roller 604. The fluid forms a fluid film around the circumference of the surface of the top roller 604 as the top roller 604 rotates in a counter-clockwise motion and the metering blade 606 sets a maximum thickness for the fluid film based on how close it is positioned to the surface of the top roller 604 in this example or either or both rollers in alternative examples.

The counter-rotation of the rollers 604, 610 draws fluid through a nip 608 formed between the top roller 604 and the bottom roller 610. The bottom roller 610 rotates in a clockwise motion, which thereby draws the fluid film through an upstream end of the nip 608. Air flow pathways 612, 614 on the downstream side of the nip 608 have a pathway that is parallel to the rotating motion of each respective roller, e.g., for the top, counter-clockwise rotating roller 604, the airflow pathway 612 is parallel to the counter-clockwise rotation of the top roller 604 and for the bottom, clockwise rotating roller 610, the airflow pathway 614 is parallel to the clockwise rotation of the bottom roller 610.

FIG. 6B shows another roller coating technique for the same pair of counter-rotating rollers 640, 610 shown in FIG. 6A in which the fluid source is a pan or reservoir 616 with fluid in it. The reservoir 616 is positioned so that a portion of the bottom roller 610 is submerged in and travels through the fluid in the pan 614 when it rotates, which encourages or causes fluid to adhere to the surface of the bottom roller 610. The metering blade 618 is positioned to contact or nearly contact the bottom roller 610 and control the thickness of the fluid film that adheres to the surface of the bottom roller 610 by defining a maximum thickness through which the fluid passes. The airflow pathways 612, 614 are the same or similar for the counter-rotating rollers for both coating techniques shown in FIGS. 6A and 6B.

The nip 608 shown in the FIGS. 6A and 6B examples includes a gap or space between the two rollers 604, 610 such that the rollers 604, 610 are positioned adjacent to, but not in direct contact with each other. The narrow gap formed by the nip 608 still causes the fluid filaments to stretch on the downstream end of the nip 608 and break into droplets to form a mist or aerosol.

Figures 7A, 7B, 7C, 7D, 7E:
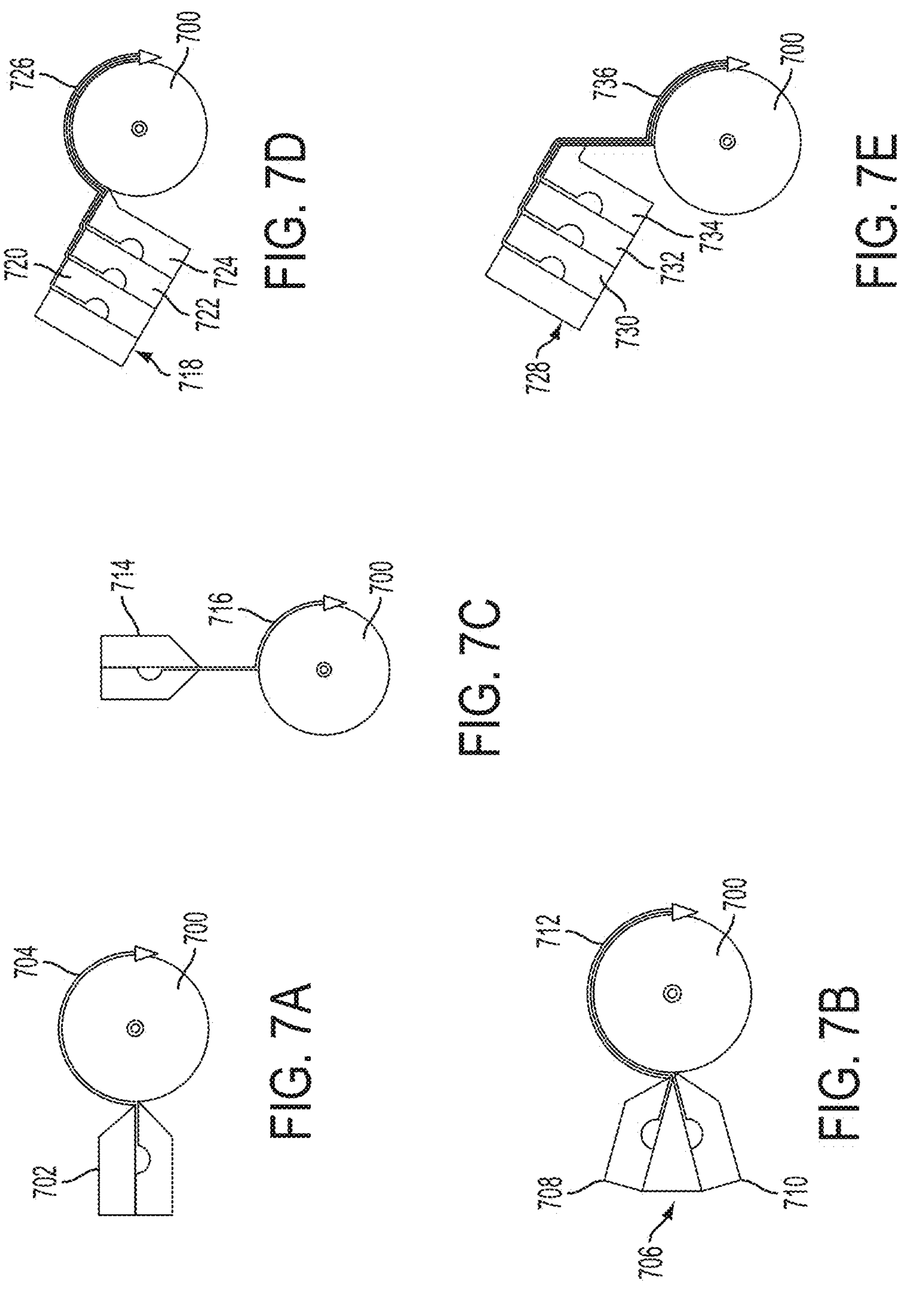
FIGS. 7A-7E are additional examples of fluid coating techniques for a pair of counter-rotating rollers.

FIGS. 7A-7E show alternative coating techniques for applying fluid to the roller(s) of strain elements having a pair of counter-rotating rollers. In these examples, a single roller 700 is shown for clarity, although the rollers are part of a pair of counter-rotating rollers. FIG. 7A shows a fluid source 702 that is applying a slot bead coating to the roller 700. The fluid source 702 is positioned to apply the fluid to the surface of the roller 700 on an upstream side of and approximately midway along the height of the roller 700. The fluid source 702 is in contact or near contact with the surface of the roller 700 in this example. The fluid 704 coats the circumference of the roller 700.

FIG. 7B has a fluid source 706 having a first fluid 708 and a second fluid 710 that apply a multi-layer slot bead coating to the roller 700. Similar to the single-layer slot bead coating technique discussed in FIG. 7A, the fluid source 706 is positioned to apply the fluid to the surface of the roller 700 on an upstream side of and approximately midway along the height of the roller 700 and is in contact or near contact with the surface of the roller 700. However, in this example, the fluid source 706 includes a first fluid 708 and a second fluid 710 that are overlaid on each other and are applied as a multi-layer fluid 712 to the surface of the roller 700. The multi-layer fluid 712 coats the circumference of the roller 700.

FIG. 7C shows a slot curtain coating technique in which the fluid source 714 is positioned above and approximately midway along with width of the roller 700. The fluid source 714 is also spaced apart from the roller 700 and does not come into physical contact with the surface of the roller 700 in applying the fluid to the roller 700, which causes the fluid to travel a distance through the air before contacting the roller 700. The fluid pathway 716 extends around the circumference of the roller in a similar fashion to the other alternative coating techniques discussed above in FIGS. 7A and 7B.

FIG. 7D shows a slide bead coating technique in which the fluid source 718 includes a first fluid 720, a second fluid 722, and a third fluid 724 that together create a multi-layer fluid 726 that adheres to the surface of the roller 700. The fluid source 718 is positioned on a side of and is tilted at an angle with respect to the roller 700 such that when each of the first fluid 720, the second fluid 722, and the third fluid 724 are dispensed, they run into each other and form the multi-layer fluid 726. The fluid source 718 in this example is positioned to dispense the fluid 726 either in contact or in near contact with the roller 700. Similar to the other examples discussed above, the fluid pathway of the fluid 726 extends around the circumference of the roller 700.

FIG. 7E shows a slide curtain coating technique in which the fluid source 728 includes a first fluid 730, a second fluid 732, and a third fluid 734 that together create a multi-layer fluid 736 that adheres to the surface of the roller 700. The fluid source 728 is positioned to a side of and is tilted at an angle with respect to the roller 700 such that when each of the first fluid 730, the second fluid 732, and the third fluid 734 are dispensed, they run into each other and form the multi-layer fluid 736. The fluid source 728 is spaced apart from the surface of the roller 700 and does not come into physical contact with the surface of the roller 700 in applying the fluid 736 to the roller 700, which causes the fluid 736 to travel a distance through the air before contacting the roller 700. The fluid pathway extends in the direction perpendicular to the point of contact between the fluid 736 and the roller 700 and coats the roller 700 around its circumference.

Any suitable coating technique(s) can be used to apply fluid to the surface of a roller and the above discussed coating techniques are not designed to limit the disclosure in any way. For example, the fluid can be applied at any suitable angle and in any suitable location with respect to the roller(s). The fluid can be dripped on to one or both rollers or can be directly applied to the roller's surface. The fluid can be applied on the upstream or downstream side of the nip, although in the above examples, the rollers are round and any application of fluid on the downstream side of the nip coats the roller on the downstream side and the roller's rotation causes the fluid to enter the nip on the upstream side of the nip.

FIGS. 8-12 are example configurations for aerosol harvesting systems, each having some aid in forming the droplets of the aerosol or in directing the mist of the aerosol. Each of FIGS. 8-12 include a pair of counter-rotating rollers 800, 802, a fluid source 804, and a metering blade 806. In another example, an electric field can be applied to or near the nip to encourage the formation of droplets from the fluid filaments.

Figure 8:
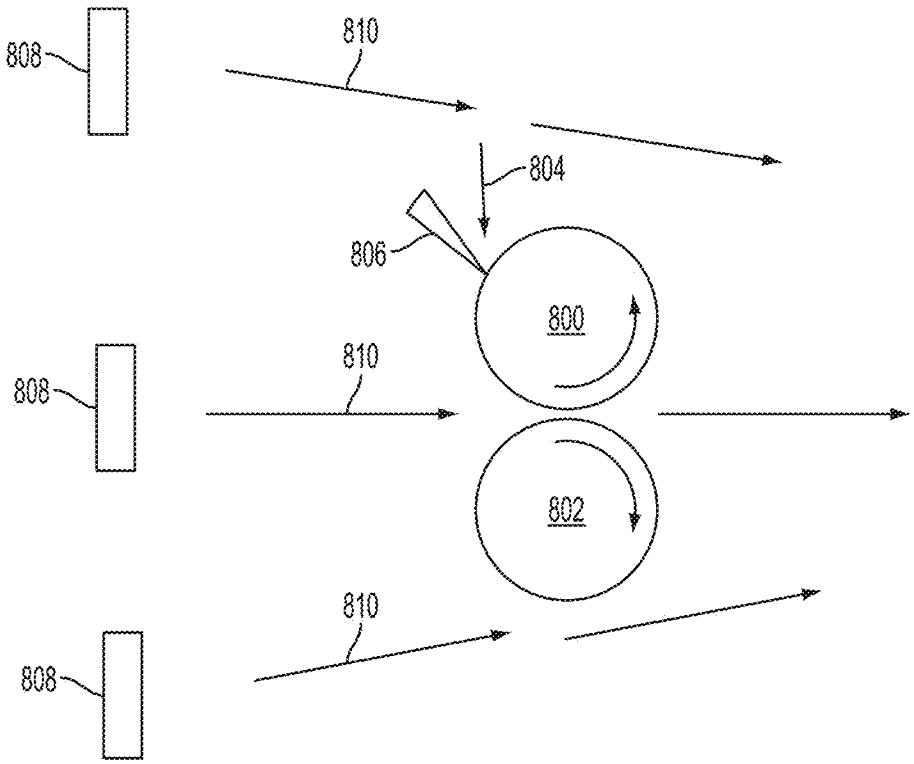
FIG. 8 is an example a system for creating aerosols that includes fans to create air flow upstream of the pair of counter-rotating rollers.

In FIG. 8, the aerosol creation system also includes three fans 808 with respective air flow pathways 810 that encourage the fluid filaments to stretch and break into droplets on the downstream side of the nip between the rollers and to encourage the formed mist or aerosol to travel in the direction of the air flow 810. Alternatively, the fans can be replaced with any suitable compressed air source or any pressure source that is able to encourage fluid filaments to stretch and break into droplets.

Figure 9:
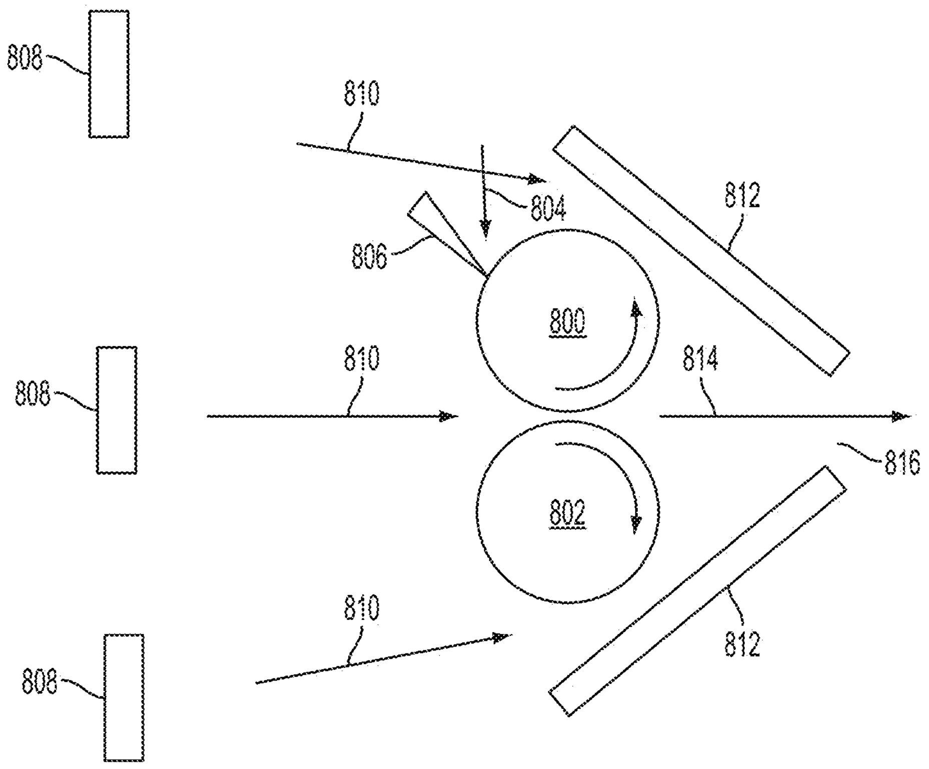
FIG. 9 is the system for creating aerosols shown in FIG. 8 with the addition of baffles that are positioned downstream of the pair of counter-rotating rollers.
Figure 10:
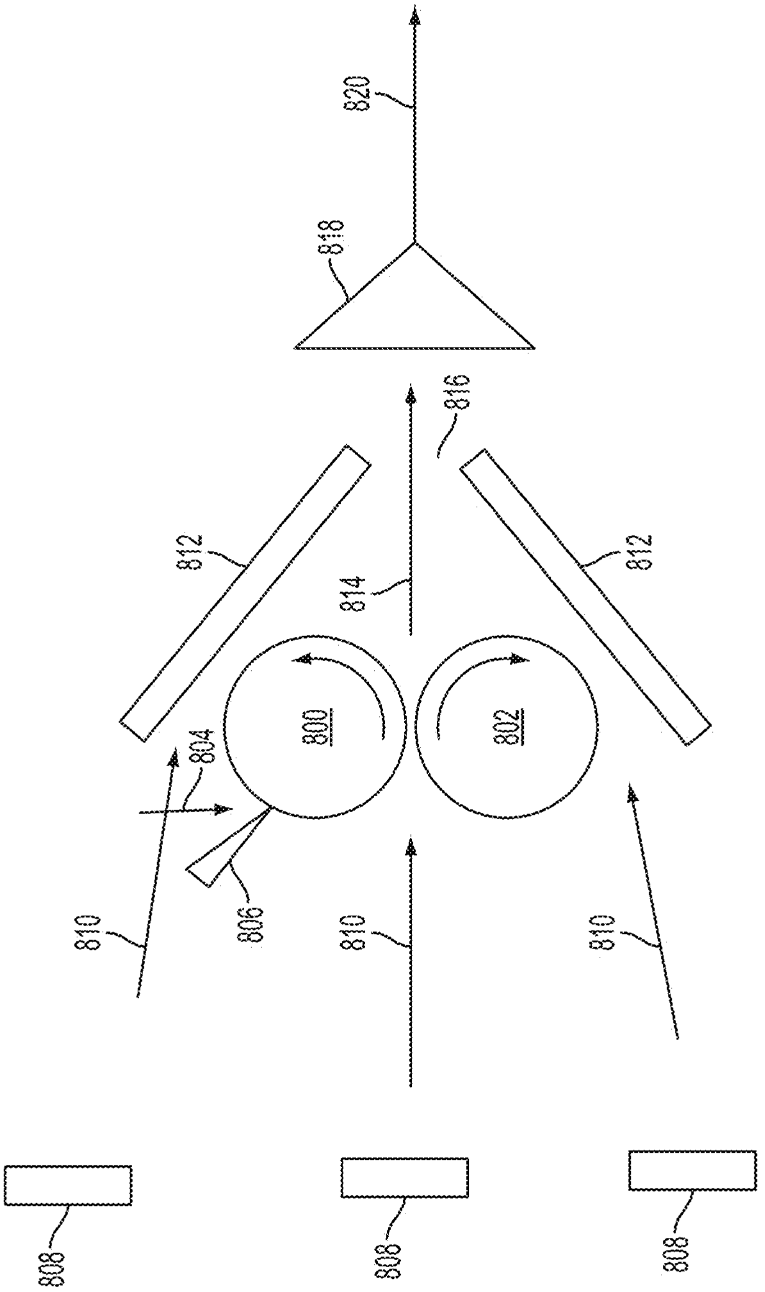
FIG. 10 is the system for creating aerosols shown in FIG. 9 with the addition of a spray collector and a vacuum that are positioned downstream of the pair of counter-rotating rollers and the baffles.
Figure 11:
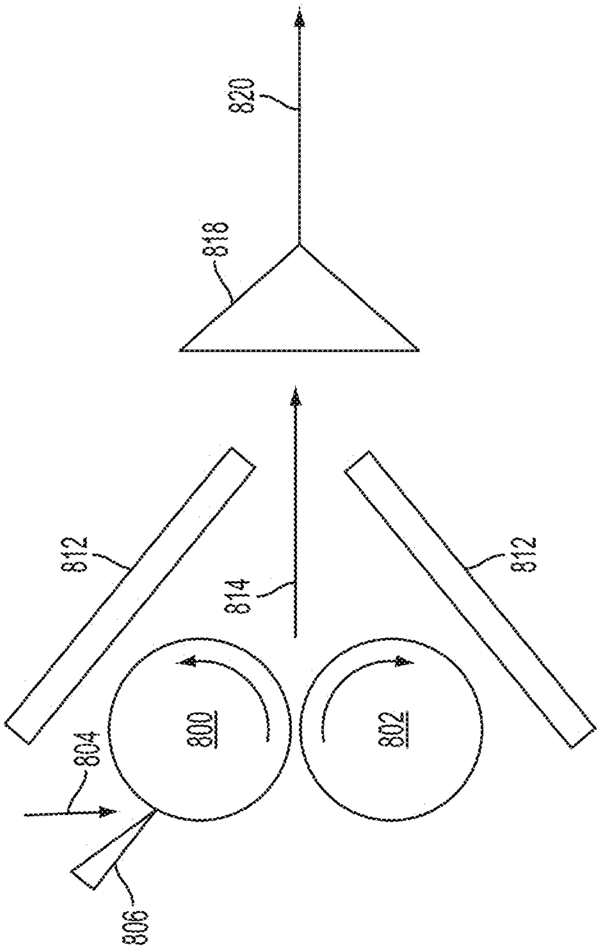
FIG. 11 is an example system for creating aerosols that includes air flow that is positioned upstream of the pair of counter-rotating rollers and baffles, a spray collector, and a vacuum that are positioned downstream of the pair of counter-rotating rollers.

FIG. 9 shows the aerosol creation system shown in FIG. 8 with the addition of two baffles 812 positioned on the downstream side of the nip and are angled with respect to the rollers 800, 802. The baffles 812 guide the formed aerosol into a pathway 814 that travels through an opening 816 formed between the two baffles 812. FIG. 10 is the aerosol creation system shown in FIG. 9 with the addition of an aerosol collector 818 and a vacuum 820. The aerosol collector 818 is an element that gathers the droplets of the aerosol into a container of any suitable type. The vacuum 820 may be applied to help encourage the droplets of the aerosol to travel into the aerosol collector 818 or to otherwise guide the aerosol in a desired direction or along a desired pathway. FIG. 11 is the same aerosol creation system shown in FIG. 10, but with the fans removed.

Figure 12:
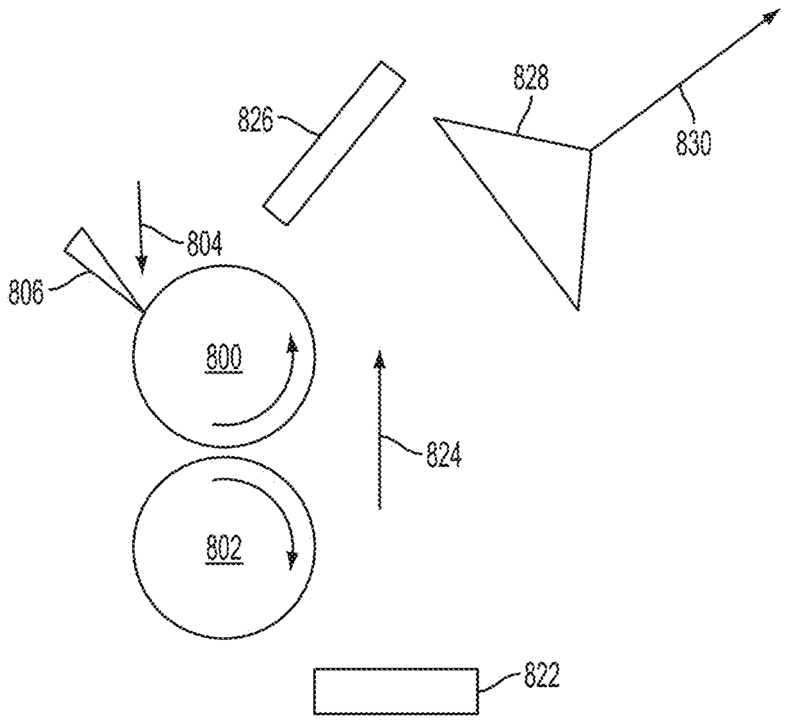
FIG. 12 is another example system for creating aerosols that includes a fan positioned below the pair of counter-rotating roller, a baffle positioned above the counter-rotating rollers, and a spray collector and vacuum positioned downstream of the counter-rotating rollers.

FIG. 12 is yet another aerosol creation system having a pair of counter-rotating rollers 800, 802, a fluid source 804, and a metering blade 806. In the example shown in FIG. 12, a fan 822 is positioned on the downstream side and below the pair of rollers 800, 802 and causes an air flow pathway 824 that is perpendicular to the direction in which the aerosol is directed away from the rollers 800, 802. The air flow pathway 824 directs the aerosol toward a baffle 826 that in turn directs the aerosol into an aerosol collector 828. A vacuum 830 may be applied to the aerosol collector 828 to encourage the aerosol to travel into the aerosol collector 828 in one configuration. In another configuration, the air stream runs through one or both of the rollers and is expelled radially through one or both of the rollers or a portion thereof.

Figure 13:
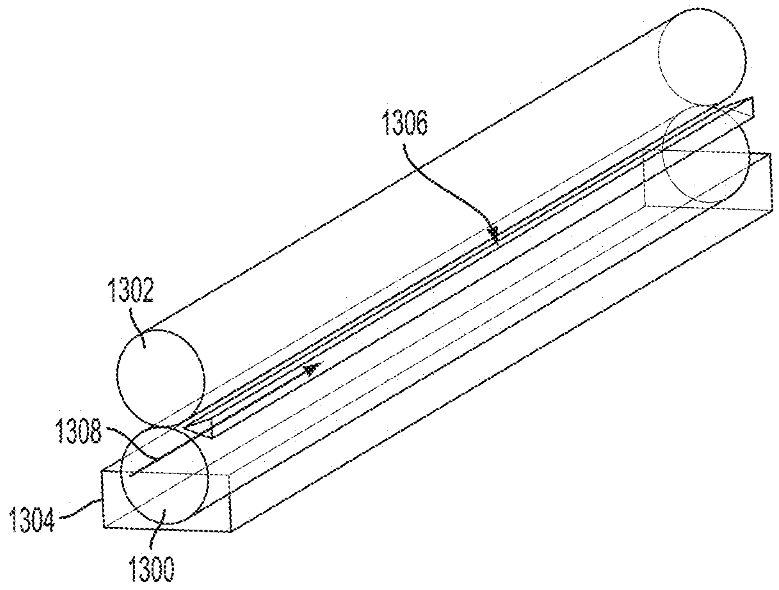
FIG. 13 is yet another example system for creating aerosols that includes an air stream that travels parallel to the counter-rotating rollers along the nip defined between the rollers.

FIG. 13 shows still another aerosol creation system that includes a pair of counter-rotating rollers 1300, 1302. The bottom roller 1302 is partially submerged in and positioned to rotate through liquid in a reservoir 1304. An air stream 1308 flows toward the droplets formed by the fluid break-up 1306 at the downstream side of the nip, approximately parallel with the length of the rollers 1300, 1302.

Figure 14:
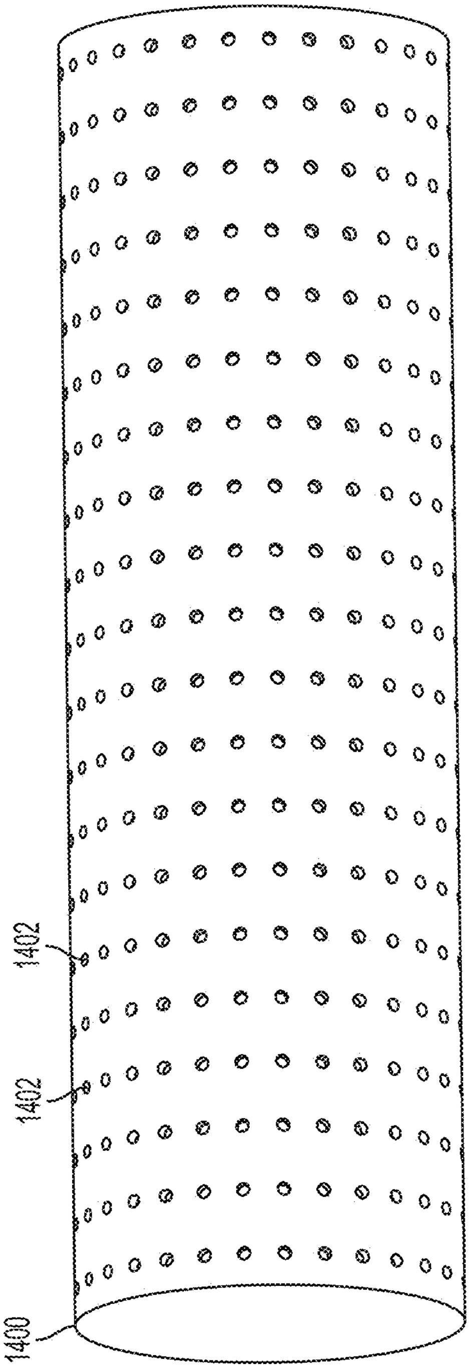
FIG. 14 is an example roller of a counter-rotating roller showing various openings on the roller surface.

FIG. 14 shows a roller 1400 having a plurality of openings 1402 in its surface. The holes draw the fluid into the openings 1402 and control the manner in which the fluid filaments are formed (i.e., the size of the fluid filaments, which also controls the size of the mist droplets), which regulates the manner in which the fluid filament break-up occurs and the resulting formation of the mist. The openings 1402 can also improve the fluid adhering to the surface of the roller 1400. Further, the openings 1402 can be either holes through the surface of the roller that extend into the interior of a hollow roller or can be openings with a floor, such as a cavity extending inward from the roller surface. The openings 1402 increase the surface area to which the fluid adheres to the roller surface. Having areas of increased fluid volume, such as in the areas where the fluid pools in the openings 1402 shown in FIG. 14, increases the volume of fluid that can be stretched when the rollers counter rotate, which in turn increases the amount of droplets that are formed from the fluid filaments reaching their point of capillary break-up. One or both rollers can include the openings shown in FIG. 14. The openings 1402 can be in any suitable configuration and can be any suitable shape and size.

Figure 15A:
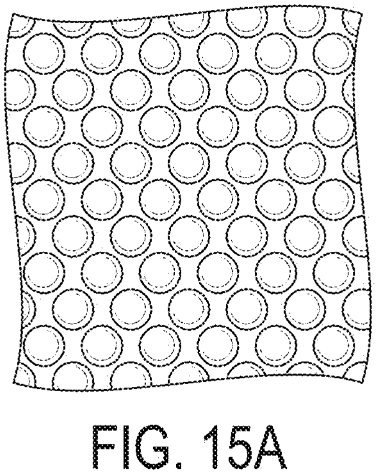
FIGS. 15A-15C are example textures for one or both of the counter-rotating rollers.
Figure 15B:
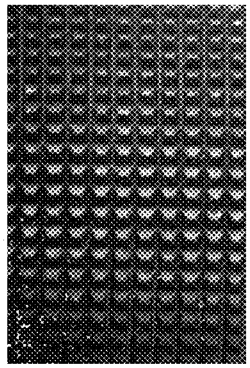
Figure 15C:
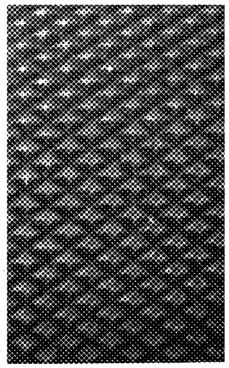
Figure 16:
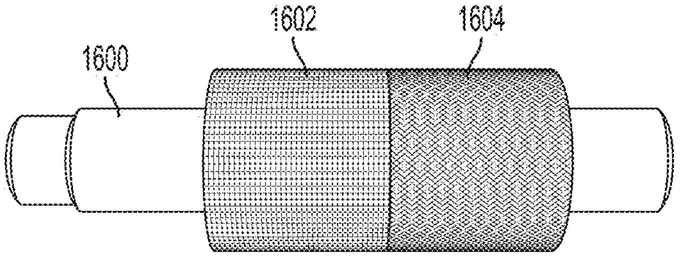
FIG. 16 is one of the counter-rotating rollers having two regions of different textured surfaces.

FIGS. 15A-15C show various textures that can be applied to the surfaces of one or both rollers. The textures can be formed integrally with the surface of the rollers or can be applied as a layer on top of the surface of the rollers. FIG. 15A shows a textured roller surface having multiple dimples. FIGS. 15B and 15C show textured roller surfaces having patterned raised elements. The textured surface(s) of the roller(s) increase the surface area of the roller to which the fluid adheres and can shape or otherwise alter the thickness, shape, flow, angle of adhering, or the like between the fluid and the surface of the roller.

Figure 17:
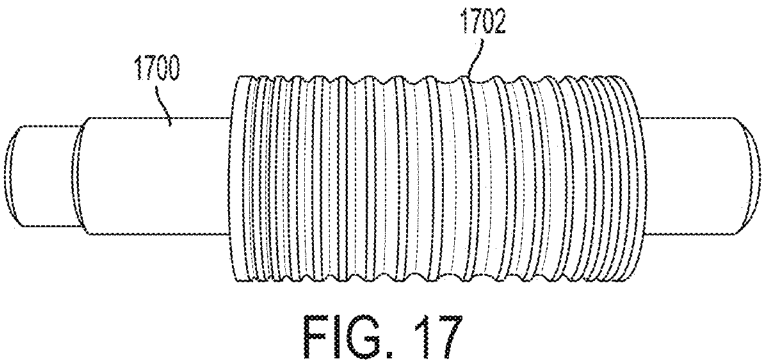
FIG. 17 is yet another example textured surface for a counter-rotating roller in which ribs spaced apart at varying distances extend around the circumference of the roller.
Figure 18:
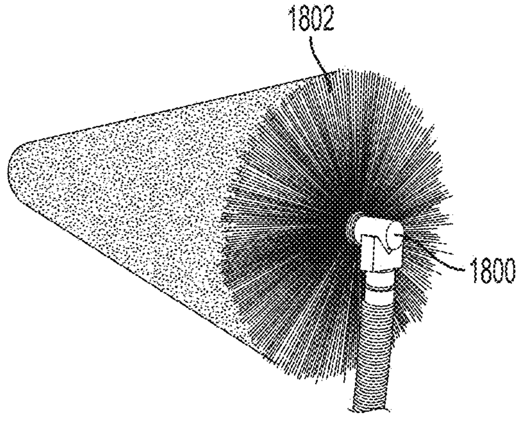
FIG. 18 is still another type of textured roller surface in which a plurality of bristles extends away from the surface of the roller.

FIG. 1600 shows a roller 1600 with a textured surface in which a first portion 1602 of the textured surface has a first texture and a second portion 1604 of the textured surface has a second texture that is different from the first texture. FIG. 17 shows yet another roller 1700 with a textured surface that includes a plurality of ribs 1702 that extend around the circumference of the roller and are spaced apart at various distances from each other. FIG. 18 is still another example roller 1800 having multiple bristles 1802 that extend away from the surface of the roller 1800.

Figure 19:
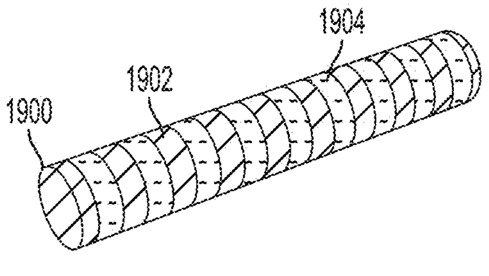
FIG. 19 is an example roller having two surface treatments applied to its surface in different regions.

FIG. 19 is yet another roller 1900 that has a first region 1902 that is treated with a first surface treatment to change the angle at which the fluid contacts the roller 1900 and a second region 1904 that is treated with a second surface treatment that changes the angle at which the fluid contacts the roller 1900 in a manner different from the first surface treatment. In other examples, only a single surface treatment is applied to the roller that changes the angle at which the fluid contacts the roller.

The texture and/or the treatment applied to the rollers can be selected based on the characteristics of the fluid that is aerosolized to customize the aerosol creation process to each fluid and provide the most efficient manner for aerosolizing the fluid among other reasons. In some examples, the textured surface of one or both of the rollers varies the thickness of the fluid coating that adheres to the surface of the roller. Such a textured surface can help vary the thickness of the fluid film in a manner that increases the efficiency of the fluid filament breaking into droplets by varying the concentration of the fluid in target regions.

The rollers can include any suitable materials such as steel or other metal(s), plastics, rubbers, or the like. The rollers or any portions thereof also can be a single material or may be any number of multiple materials. For example, a roller can have a core material that is coated with or includes a surface layer of a material that is softer than the core material. In some examples, the surface layer material encourages the fluid to adhere to the roller or may encourage the fluid to adhere to the roller at a different angle or in a different way than would occur without the surface layer material.

The orientation of the fluid source with respect to the rollers can be any desirable position. Some of the above examples discuss an air flow source that directs the droplets forming the mist or aerosol in a particular direction. The air flow source can be any gas source and is not limited to air. For example, the gas source can be positioned to cause gas to flow on either side of, above, or below the nip to encourage or cause the formation of droplets from breaking of the fluid filaments. Alternatively, the gas source can be positioned to cause gas to run through one or both rollers so the gas is expelled radially from the roller(s).

The formed mist can be directed to form an aerosol of various geometries. Any desirable geometrical shape can be formed, depending on how the mist is directed. The geometry can be any shape, such as a rectangle, cone, or conical shape and the size and contour of such shapes can be controlled by altering the volume and concentration of the aerosolized fluids.

It will be appreciated that variations of the above-disclosed systems and methods for creating aerosols and other features and functions, or alternatives thereof, may be desirably combined into many other different systems, methods, or applications. Also various presently unforeseen or unanticipated alternatives, modifications, variations, or improvements therein may be subsequently made by those skilled in the art.

The invention claimed is:

1. A process of creating an aerosol, comprising:

coating at least one of a pair of counter-rotating, adjacent rollers with a fluid, the pair of counter-rotating rollers defining a nip therebetween;

rotating the pair of counter-rotating, adjacent rollers in counter rotation with respect to each other to cause the fluid coating to be drawn into an upstream side of the nip to a downstream side of the nip, such that the fluid adheres to surfaces of each of the rollers;

causing fluid filaments of the fluid to form on a downstream side of the nip, the fluid filaments formed by stretching the fluid between respective surfaces of the pair of counter-rotating, adjacent rollers, until the filaments break into droplets on the downstream side of the nip; and harvesting the droplets at the downstream side of the nip.

2. The process of creating an aerosol of claim 1, further comprising controlling the coating of the at least one of the pair of counter-rotating, adjacent rollers by at least one of a metering blade and a type of fluid source.

3. The process of creating an aerosol of claim 2, wherein the metering blade controls a thickness of a film of the fluid on at least one of the counter-rotating, adjacent rollers.

4. The process of creating an aerosol of claim 2, wherein the type of fluid source is a fluid feed arranged to cause the fluid to contact a top roller of the pair of counter-rotating, adjacent rollers and the metering blade controls the thickness of the fluid.

5. The process of creating an aerosol of claim 2, wherein the type of fluid source is a coating pan in which a bottom roller is partially submerged and the metering blade controls the thickness of the fluid on the bottom roller.

6. The process of creating an aerosol of claim 1, further comprising causing air to flow toward the upstream side of the nip.

7. The process of creating an aerosol of claim 1, wherein harvesting the droplets includes applying a vacuum to the droplets at the downstream side of the nip.

8. The process of creating an aerosol of claim 1, wherein coating at least one of the pair of counter-rotating, adjacent rollers with a fluid comprises submerging a portion of a lower roller in a coating pan containing the fluid.

9. The process of creating an aerosol of claim 1, wherein coating at least one of the pair of counter-rotating, adjacent rollers with a fluid comprises applying the fluid as a slot bead to one of the pair of rollers.

10. The process of creating an aerosol of claim 1, wherein coating at least one of the pair of counter-rotating, adjacent rollers comprises applying a first fluid from a first slot bead and a second fluid from a second slot bead, wherein the fluid is applied as a multi-layer fluid.

11. The process of creating an aerosol of claim 10, further comprising applying a third fluid from a third slot bead to form a layer of the multi-layer fluid.

12. The process of creating an aerosol of claim 1, wherein coating at least one of the pair of counter-rotating, adjacent rollers comprises applying the fluid as a slot curtain from a position above a top roller and spaced apart from the roller.

13. The process of creating an aerosol of claim 12, wherein applying the fluid as the slot curtain comprises applying a first fluid, a second, fluid and a third fluid as a multi-layer fluid.

14. The process of creating an aerosol of claim 13, wherein a fluid source used to coat at least one roller is positioned midway along a height of the roller.

15. The process of creating an aerosol of claim 1, further comprising directing the droplets in a direction away from the rollers.

16. The process of claim 15, wherein the direction away from the rollers is a perpendicular direction from the rollers.

17. The process of claim 15, wherein the direction away from the rollers is a direction parallel with the length of the rollers.

18. The process of claim 1, wherein harvesting the droplets comprises using baffles positioned on the downstream side of the nip.

19. The process of claim 1, wherein the at least one of the pair of counter-rotating rollers has a first region having a first surface treatment to change an angle at which the fluid contacts the at least one roller to a first angle and a second region having a second surface treatment to change the angle at which the fluid contacts the at least one roller to a second angle.

* * * * *